(12) United States Patent
Lee

(10) Patent No.: US 7,789,999 B2
(45) Date of Patent: Sep. 7, 2010

(54) THERMAL DECOMPOSITION TREATMENT SYSTEM OF FLAMMABLE WASTE AND METHOD FOR TREATING THE WASTE USING THE SYSTEM

(76) Inventor: Jong Ho Lee, 301, Ssangyong Platinum-river, Cheonho-dong 432-10, Gangdon-gu, Seoul (KR) 134-020

(*) Notice: Subject to any disclaimer, the term of this patent is extended or adjusted under 35 U.S.C. 154(b) by 0 days.

(21) Appl. No.: 12/530,189

(22) PCT Filed: Jan. 22, 2009

(86) PCT No.: PCT/KR2009/000342

§ 371 (c)(1),
(2), (4) Date: Sep. 4, 2009

(87) PCT Pub. No.: WO2009/093852

PCT Pub. Date: Jul. 30, 2009

(65) Prior Publication Data

US 2010/0006415 A1    Jan. 14, 2010

(30) Foreign Application Priority Data

Jan. 25, 2008    (KR) .................. 10-2008-0007916

(51) Int. Cl.
*C10B 51/00*    (2006.01)

(52) U.S. Cl. .................. 201/14; 201/21; 201/25; 201/29; 201/38; 202/96; 588/321; 110/235; 110/242; 110/253

(58) Field of Classification Search .................. 201/14, 201/21, 25, 29, 38; 110/229, 233, 246, 235, 110/242, 253; 48/113, 127.9; 202/96, 105; 588/321

See application file for complete search history.

(56) References Cited

U.S. PATENT DOCUMENTS

| | | | | |
|---|---|---|---|---|
| 5,302,254 | A * | 4/1994 | Martin et al. | 201/21 |
| 6,387,221 | B1 * | 5/2002 | Schoenhard | 201/25 |
| 7,025,006 | B2 * | 4/2006 | Jeulin | 110/229 |
| 7,188,571 | B2 * | 3/2007 | Nusimovich | 110/229 |
| 7,452,392 | B2 * | 11/2008 | Nick et al. | 48/198.1 |
| 2008/0202395 | A1 * | 8/2008 | Jeong | 110/203 |

FOREIGN PATENT DOCUMENTS

| | | |
|---|---|---|
| JP | 08312937 | 11/1996 |
| KR | 1019940024038 | 11/1994 |
| KR | 101998042984 | 8/1998 |
| KR | 1020020082184 A | 10/2002 |
| KR | 1020050100486 A | 10/2005 |
| KR | 10-2006-0081553 * | 1/2007 |
| KR | 100670856 B1 | 11/2007 |

* cited by examiner

*Primary Examiner*—N. Bhat
(74) *Attorney, Agent, or Firm*—Robert D. Atkins

(57) ABSTRACT

Described is a thermal decomposition treatment system and method of using the thermal decomposition treatment system wherein flammable waste is inputted into a trash burner which is shielded from air or gas and the waste is thermally decomposed and carbonized. The thermal decomposition treatment chamber includes a plurality of heating tubes wherein the flammable waste is inputted into the chambers while hot air is passed through the heating tubes which indirectly heats the flammable waste in an anaerobic environment the resulting gases are purified, recovered and reused.

14 Claims, 6 Drawing Sheets

[Fig. 1]
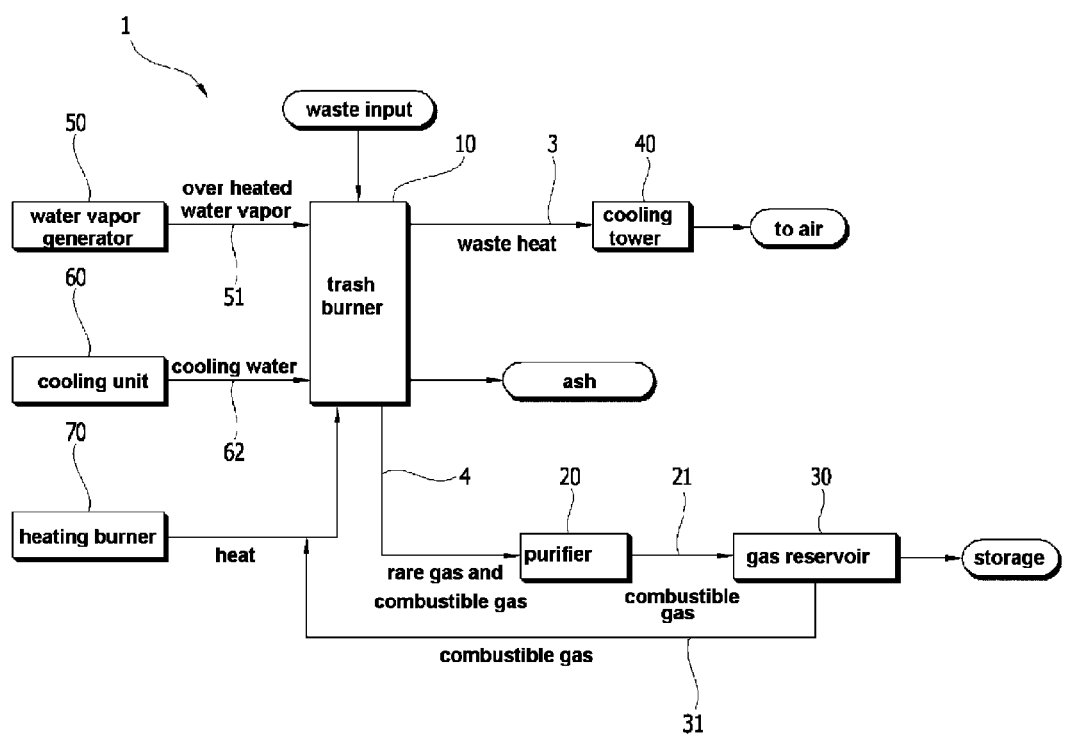

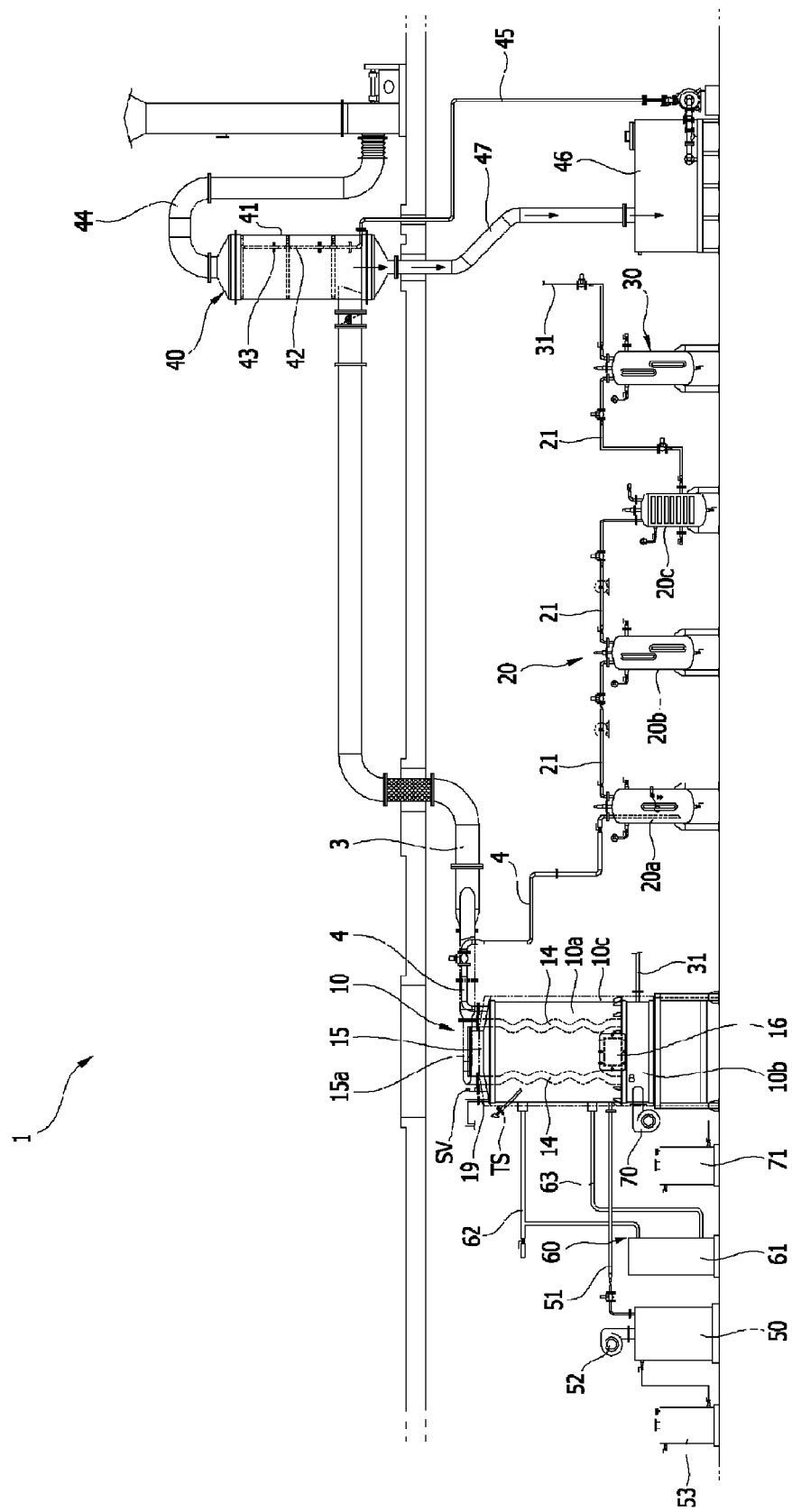
[Fig. 2]

[Fig. 3]
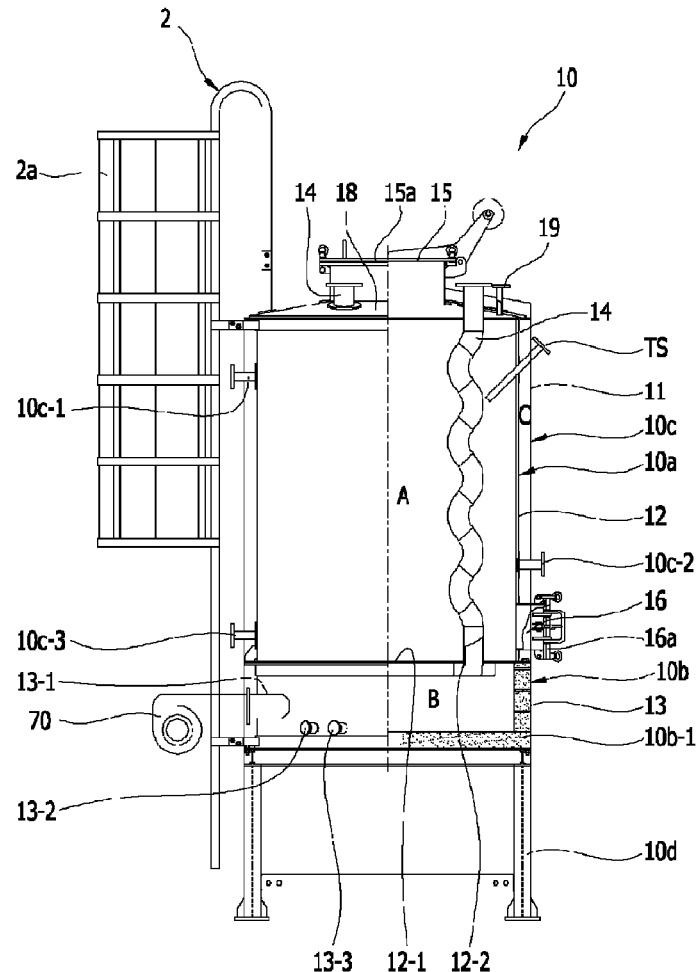
[Fig. 4]
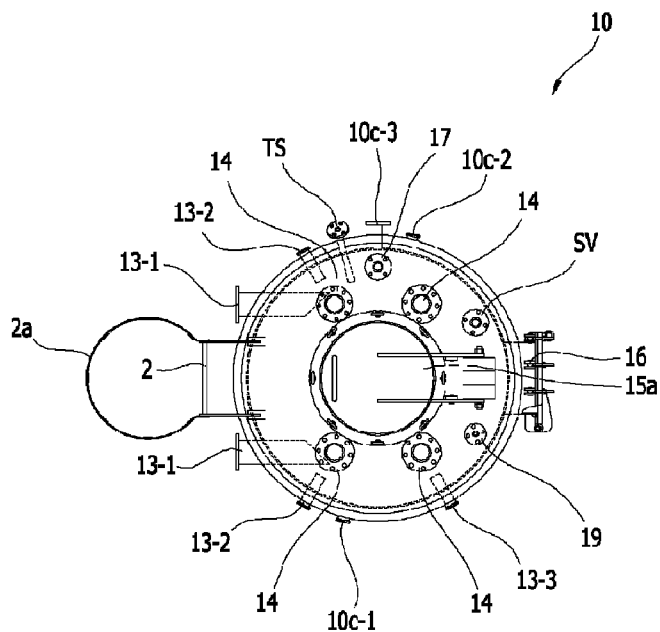

[Fig. 5]
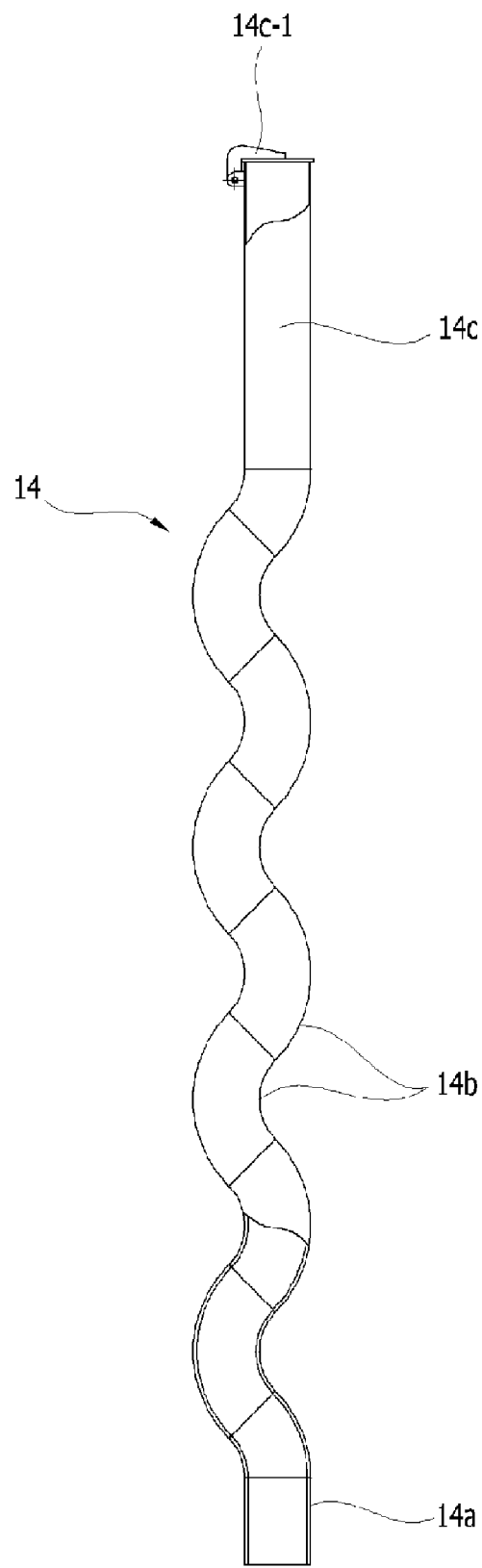

[Fig. 6]
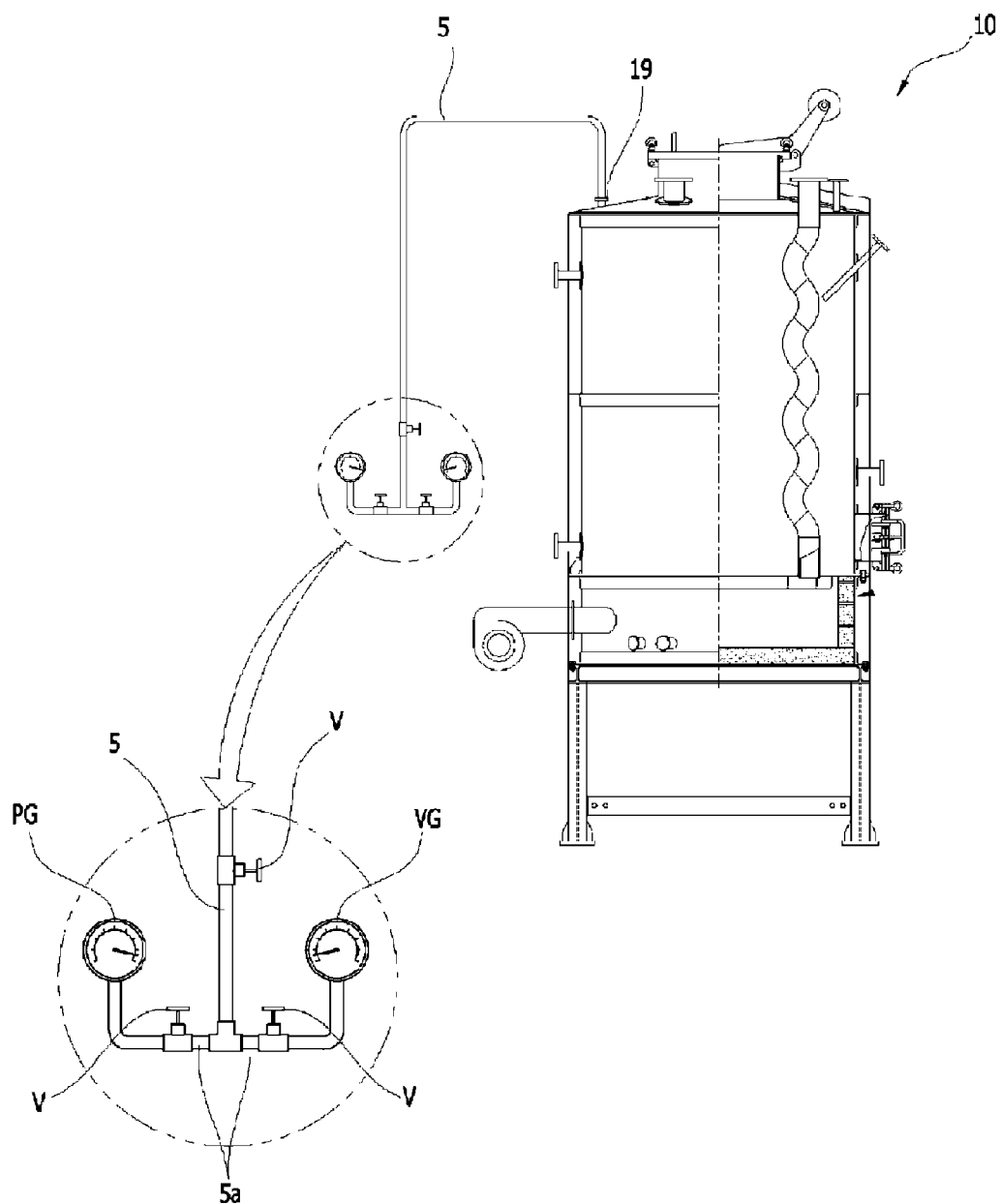

[Fig. 7]
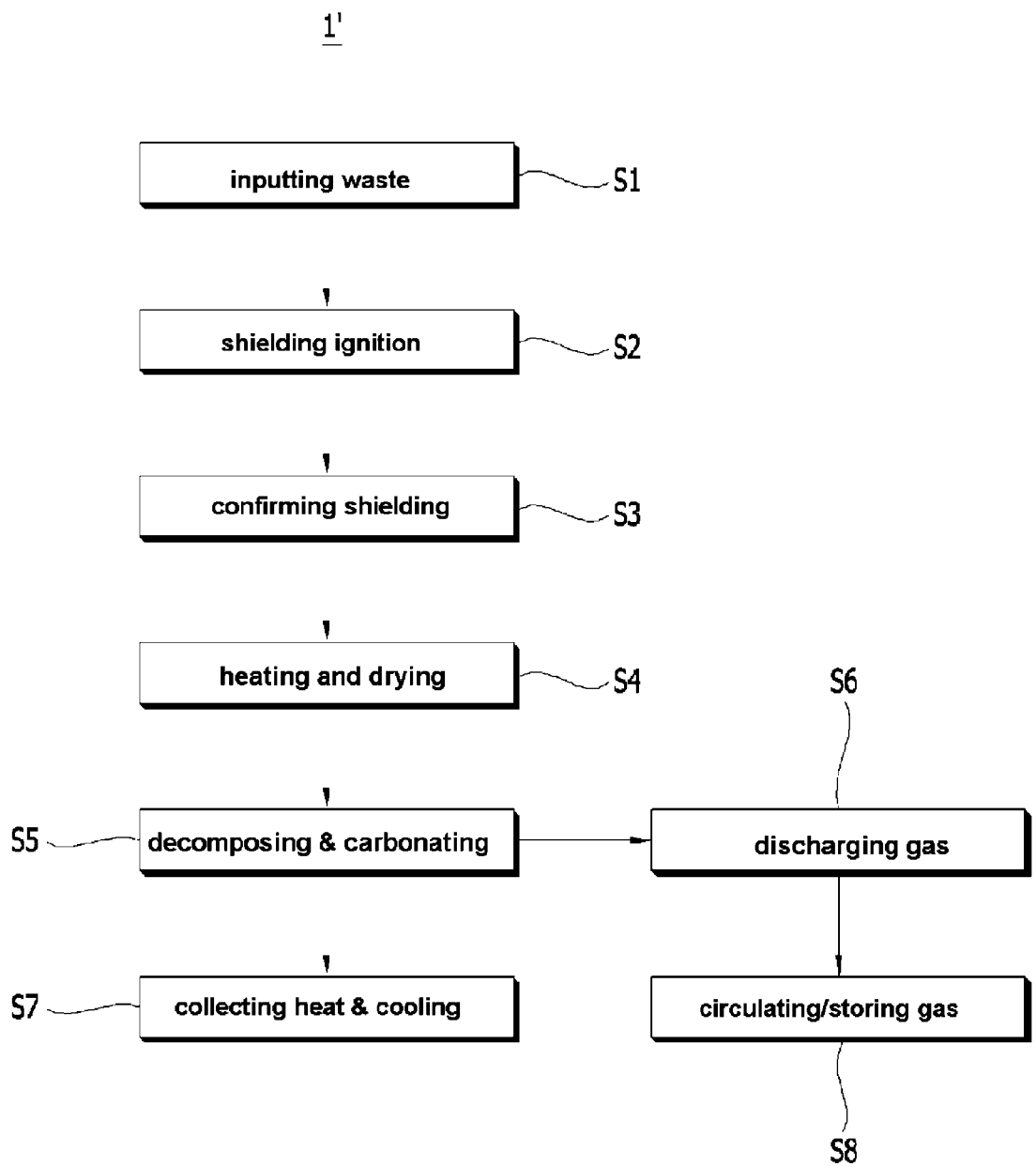

THERMAL DECOMPOSITION TREATMENT SYSTEM OF FLAMMABLE WASTE AND METHOD FOR TREATING THE WASTE USING THE SYSTEM

CLAIM TO FOREIGN PRIORITY

This application is a U.S. National Stage Application filed under 35 U.S.C. 371 claiming priority from International Application No. PCT/KR2009/000342, filed Jan. 22, 2009, which claims the benefit of Korean Application No. 10-2008-007916, filed Jan. 25, 2008, and which applications are incorporated herein by reference.

FIELD OF THE INVENTION

The present invention relates to a system for treating various flammable wastes and a method for treating the same, and more particularly, to an improved a system for treating flammable waste and a method for treating the same through which the flammable waste inputted into a trash burner is shielded from air or gas and the waste is thermally decomposed and carbonated through a indirect heating by a heating tube and then combustible gas is extracted and recovered for a reuse without emitting contaminated gas, etc.

BACKGROUND OF THE INVENTION

Recently, a treatment of flammable waste such as sludge of industrial waste and a life waste appears to be important social dispute and thus various efficient solutions have been proposed.

Most popular method for treating the flammable waste among them is to minimize a volume of the flammable waste for incinerating or burying it, or throwing out to ocean.

However, the method of burying to the ground, incinerating or throwing out to ocean the flammable waste causes several social problems wherein in a case of a landfill secondary contamination damages caused from leachate and defined area for a landfill causes to limit the method of burying, and further in a case of throwing out to ocean it causes to contaminate the ocean and thus is increasingly prohibited.

Furthermore, in a case of incinerating the flammable waste, contaminated gases containing a plurality of poisonous gases such as dioxin, etc., are emitted directly to atmosphere and thus they cause to deteriorate environment and threaten human health. Additionally, in a case of incinerating the flammable waste combustible, gases are emitted outside, which can be reused as fuel, however, it is impossible to recover and reuse the useful combustible gas through a conventional incinerating method, and thus it wastes natural resource.

In order to solve the above problems various apparatus and methods for incinerating the flammable waste and extracting combustible gases have been developed. However, according the conventional treatment apparatus and method too much time and heat need to remove moisture from the waste and extract combustible gases and thus they cost expensively.

In addition, in taking a consideration of the above matters, other various methods of crushing and compressing the waste have been proposed; however, there are limitations to remove completely air, moisture and gas which are remaining in deep inside the waste and further production of poisonous material during a treatment step is difficult to be avoided and thus a good quality of combustible gases can not be obtained, causing the treatment step not to be practical.

Meanwhile, in order to solve aforementioned problems a waste treatment method using a thermal decomposition has been invented wherein the thermal decomposition refers to a method in which the waste is heated in a state of organic oxygen free or low level of oxygen to produce fuel in a solid, liquid and gaseous state, and in a practical apparatus the waste itself is thermally decomposed without removing air to extract combustible gases. However, according to this thermal decomposition method since the waste is thermally decomposed without removing air, the contaminated gases containing poisonous contaminated material resulted from oxidation and incomplete combustion thereof can be produced.

In order to avoid the above problems Korean Patent registration No. 10-0510818 disclosed a waste treatment method in which thermal decomposition and carbonation procedures were performed in a vacuum state. According to the above disclosure, the waste and the contaminated gas inside a heating furnace were discharged outside by an expansion of over heated water vapor, however, some air was contaminated still and further fuel cost increases due to repeated cooling and reheating.

Furthermore, in order to install components inside the apparatus a worker has to enter directly into the apparatus for his workings such as welding, however, this is only possible in case of installing a big incineration apparatus and impossible in case of installing a middle or small incineration apparatus.

Additionally, according to the aforementioned vacuum method it takes too long time for inside of the furnace to be vacuumed through a cooling thereof, causing a working to be inefficient and further furnace itself is contracted and deformed, causing implementing of the apparatus to be limited.

Meanwhile, a rotary kiln method has been proposed in which a heating furnace is installed laterally in a lengthwise and is rotated through a driving means for the waste to be incinerated by an external heating; however, a problem of poisonous gases emission caused from combustion is not settled since the rotary kiln method is not performed in a vacuum state and further since the driving means has to be prepared separately, causing a configuration and fabrication thereof to be difficult and cost to be expensive. Additionally, since power amount required to rotate a heating furnace having a relative larger capacity is too much and fuel cost necessary for an external heating increase, energy efficiency is low and further recovery of reside waste is difficult, causing an implement thereof to be limited.

SUMMARY OF THE INVENTION

Accordingly, the present invention has been proposed to solve the above drawbacks. The object of the present invention is relates to provide a thermal decomposition system of the flammable waste and a waste treatment method of the waste using the same in which the flammable waste is thermally decomposed and carbonated in a state of the flammable waste being shielded from air or gases and poisonous and contaminated gases contained in the waste is avoided from being discharged outside, and thus an atmospheric contamination can be avoided, and further only the produced combustible gases are stored separately and collected to be reused.

Additionally, the object of the present invention relates to provide a thermal decomposition system of the flammable waste and a waste treatment method of the waste using the same in which the flammable waste is treated using a trash burner including a thermal decomposition chamber, a combustion chamber and a cooling water chamber and further a state of the waste inside the thermal decomposition chamber being shielded from air or gases by the cooling water chamber, that is, a state of there being no air to be burnt is easily confirmed by a vacuum gauge, thereby improving a system efficiency.

Meanwhile, the object of the present invention relates to provide a waste treatment method comprising steps of inputting the waste, shielding an ignition by over heated water vapor, confirming the ignition shielding, heating and drying, decomposing thermally and carbonating the waste, discharging the gas containing over heated water vapor and poisonous material, and circulating the combustible gas and storing it.

In order to achieve the above object, the thermal decomposition treatment system of a flammable waste according to the present invention comprises: a trash burner including a thermal decomposition chamber in which a plurality of heating tubes passing through a hollow inside thereof is provided and the flammable waste inputted therein is heated indirectly by the heat emitted from the heating tubes and decomposed thermally and carbonated, a combustion chamber which is placed separately by a partition on the lower part of the thermal decomposition chamber and provides heat for decomposing the waste by allowing the heated high temperature air to be passed through the heating tubes, and a cooling water chamber which is spaced from the thermal decomposition chamber and surrounded by and into which the cooling water is inputted and circulated; a water vapor generator which is communicated to the thermal decomposition chamber through the water vapor supply tube and into which over heated water vapor is forced to be inputted through this configuration; a cooling unit which is communicated to the cooling water chamber through a cooling water input tube and a cooling water discharging tube, and the cooling water is provided and circulated through this configuration; a purifier which is communicated to the thermal decomposition chamber through the gas discharging tube, and poisonous gases contained in rare gases and combustible gas are removed through this configuration; a combustible gas storage reservoir which is communicated to the purifier through a gas transfer tube and stores the purified combustible gas, and allows some of it to be inputted into the combustion chamber through a gas circulation tube; and a cooling tower which is communicated to a waste heat recovery tube connected to the heating tube and which collects high temperature air passed therethrough, and allows the high temperature air to be cooled and discharged to atmosphere.

At this time, the thermal decomposition chamber of the trash burner includes a waste input port provided with a open and closable cover for inputting the waste on one upper side thereof, a ash collection port provided with an open and closable cover for collecting the decomposed thermally and carbonated waste on one lower side, and an internal drum body having a closed internal space where a plurality of heating tubes passes through a upper place and a bottom place thereof wherein a gas discharging port connected to the gas discharging tube and a water vapor supply port connected to a water vapor supply tube are formed on one side of the internal drum body and further a safety valve, a temperature sensor, a pressure gauge and a vacuum gauge are formed on one side of the internal drum body.

Furthermore, if necessary, the pressure gauge and the vacuum gauge are connected to a pressure/vacuum gauge connection ports formed on the upper plate of the internal drum body and are formed, respectively, on two branch pipes of a gauge connection tube extending externally and thus a state of the thermal decomposition chamber cab be confirmed through an adjustment of the control valve.

Additionally, the heating tube is configured as a repeated curved tube shape, and includes a lower tube fitted into a lower surface plate of the thermal decomposition chamber and communicated to the combustion chamber, a plurality of connection tubes connected to the upper part of the lower tube and forming a repeated curved shape, and an upper tube one end of which is connected to the upper part of the connection tube and the other end of which is connected to the waste heat recovery tube and which passes through the upper plate of the thermal decomposition chamber and on upper end of which a damper is formed.

Subsequently, the combustion chamber of the trash burner includes a main body inner peripheral surface of which is surrounded by fire material and which has an internal space communicated to the heating tube, a gas circulation port connected to the gas circulation tube on one side of the main body, and a burner placement hole into which a burner for heating is placed.

At this time, the main body of the combustion chamber further includes an air input port and the air input port is connected to an air input unit inputting continuously external air.

In addition, the cooling water chamber of the trash burner includes an external drum body spaced from a predetermined distance from an external surface of the thermal decomposition chamber and having a closed internal space therebetween wherein a cooling water input port connected to a cooling water input tube is formed on one side of the external drum body and a cooling water discharging port connected to a cooling water discharging tube is formed on one side of the external drum body.

Meanwhile, if necessary, the trash burner further includes a support frame which is placed on the lower part of the combustion chamber and spaced a predetermined distance from a earth ground, and a ladder on an external side thereof which has a longer length than a whole length of the trash burner and on upper part of which a safety net is provided.

Next, the cooling unit includes a cooling water input tube supplying external cooling water to the cooling water chamber through a valve adjustment, a cooling water discharge tube for discharging outside the cooling water contained in the cooling water chamber through a valve adjustment and a cooling cooler on one side of which is connected one side among the cooling water tube lines and the other side of which is connected to an end of the cooling water discharge tube wherein when the cooling water chamber is filled with the cooling water, the external cooling water inputting through the cooling water input tube is stopped and the cooling cooler re-cools the cooling water used in the cooling water and allows the re-cooled cooling water to be inputted into the cooling water chamber to be circulated.

Additionally, the purifier includes at least one or more of purification tanks communicated to each other through the gas transfer tube in which rare gases and combustible gas are inputted therein through a connection to an end of the gas discharge tube and poisonous material and smell are removed using neutralization water, absorption coal or a filter.

In subsequent, the cooling tower includes a case to one side of which the waste heat recovery tube is communicated and upper part of which is connected to the discharge tube and on inner part of which a plurality of cooling tubes provided with injection nozzles is provided vertically, a cooling water transfer tube connected to the cooling water tube through a pump and transferring the cooling water, and a cooling water tank the upper part of which is connected to a communication tube extending down the case and one side of which is connected to the cooling water transfer tube wherein the high temperature air transferred through the waste heat recovery tube by a cooling water injection through the injection nozzle is cooled and discharged.

Meanwhile, a waste treatment method using a thermal decomposing treatment system of a waste according to the present invention comprises the following procedures: The waste treatment method using the thermal decomposition treatment system comprising a trash burner including a thermal decomposition chamber, a combustion chamber placed on the lower part of the thermal decomposition chamber and a cooling water chamber surrounding spacedly the thermal decomposition chamber, comprises: inputting the waste into the thermal decomposition chamber and closing it; shielding an ignition by injecting over heated water vapor into the thermal decomposition chamber and making the waste therein be shielded from air or gases by an expanded pressure of the over heated water vapor; confirming the ignition shielding by inputting the cooling water into the cooling water chamber and lowering the expanded pressure caused from the over heated water vapor in the thermal decomposition chamber and then confirming an operation of a vacuum gauge provided on one side of the thermal decomposition chamber and no air to be burnt in the thermal decomposition chamber; heating and drying the waste by heating the combustion chamber through a burner and heating indirectly the thermal decomposition chamber through high temperature air made by the heating; decomposing thermally and carbonating the flammable waste by a high temperature in the thermal decomposition chamber; gas discharging the re-expanded over heated water vapor by the heating and drying step and the thermal decomposition can carbonation step and produced rare gases and combustible gas through an operation of a valve; and a gas circulation and storage performed by purifying contaminated gas discharged in the gas discharging step through a purifier and storing the combustible gas to a combustible gas storage reservoir or circulating the combustible gas to the combustion chamber.

Furthermore, the thermal decomposition method of the waste further comprises collecting the high temperature air which heats indirectly the thermal decomposition chamber in the thermal decomposition and carbonation step, and cooling it using a cooling tower in a cooling water injection way and discharging it.

Meanwhile, a trash burner performed in the aforementioned procedures includes a thermal decomposition chamber in which a plurality of heating tubes passing through a hollow inside thereof is provided and the flammable waste inputted therein is heated indirectly by the heat emitted from the heating tubes and is decomposed thermally and carbonated, a combustion chamber which is placed separately by a partition on the lower part of the thermal decomposition chamber and provides heat for decomposing the waste by allowing the heated high temperature air to be passed through the heating tubes, and a cooling water chamber which is spaced from and surrounded by the thermal decomposition chamber and into which the cooling water is inputted and circulated wherein a safety valve, a temperature sensor, a pressure gauge and a vacuum gauge are formed on one side of the thermal decomposition chamber.

According to the present invention, the flammable waste is thermally decomposed and carbonated in a state of being shielded from air or gases, and contaminated and poisonous gases are avoided being discharged outside, thereby avoiding an atmospheric contamination. Additionally, only produced combustible gases are stored to be collected and reused.

Additionally, the inside of the trash burner is filled with over heated water vapor to make a state of the flammable waste being shielded from air, that is, there is no air to be burnt and thus the waste is thermally decomposed and carbonated by indirect heating to avoid an atmospheric contamination resulted from a combustion and extract efficiently combustible gas produced by drying the waste, thereby saving energy.

Furthermore, the vacuum gauge is operated by the cooling water circulated through the cooling water chamber of the trash burner to confirm visually that there is no air to be burnt inside the thermal decomposition chamber, thereby maximizing a reliability and a process efficiency.

BRIEF DESCRIPTION OF THE DRAWINGS

The following drawings, which are included to provide a further understanding of the invention and are incorporated in and constitute a part of this specification, illustrate embodiments of the invention and together with the description serve to explain the principle of the invention. In the drawings:

FIG. 1 schematically shows thermal decomposition treatment system of flammable waste according to the present invention;

FIG. 2 is a view showing a configuration of thermal decomposition treatment system of flammable waste according to the present invention;

FIGS. 3 and 4 are views showing an incineration furnace applied to a thermal decomposition treatment system of flammable waste according to the present invention;

FIGS. 5 and 6 are front views showing a heating tube, a pressure gauge, and a vacuum gage applied to FIGS. 3 and 4; and FIG. 7 is a flowchart showing a method for treating the waste using a thermal decomposition treatment system of flammable waste according to the present invention.

DETAILED DESCRIPTION OF THE DRAWINGS

Hereinafter, preferred embodiments of a thermal decomposition treatment system of a flammable waste and a treatment method of the waste using the system will be described in detail, referring to the accompanying drawings.

FIG. 1 schematically shows a thermal decomposition treatment system according of flammable waste to the present invention, FIG. 2 is a view showing a configuration of a thermal decomposition treatment system of flammable waste according to the present invention, FIGS. 3 and 4 are views showing an incineration furnace applied to a thermal decomposition treatment system of flammable waste according to the present invention, FIGS. 5 and 6 are front views showing a heating tube, a pressure gauge, and a vacuum gage applied to FIGS. 3 and 4, and FIG. 7 is a flowchart showing a method for treating the waste using a thermal decomposition treatment system of flammable waste according to the present invention.

As shown in drawings, a thermal decomposition treatment system of flammable waste 1 according to the present invention includes a trash burner 10 into which flammable waste is inputted and is thermally decomposed and carbonated to emit rare gases and combustible gases, a water vapor generator 50 and a cooling unit 60 connected to the trash burner 10, a purifier 20 for removing poisonous material contained in the gases, a combustible gas reservoir 30 for storing combustible gas, and a cooling tower 40 for cooling waste heat contained in high temperature air and emitting to external atmosphere.

Additionally, a heating burner 70 for heating the lower part of the trash burner 10 to produce high temperature air for an indirect heating is provided on one side of the trash burner 10.

Preferably, the trash burner 10 includes a thermal decomposition chamber 10a having an internal space A into which flammable waste is inputted and is thermally decomposed and carbonated, a combustion chamber 10b having an internal space B which produces heat by the heating burner 70 and heats indirectly the thermal decomposition chamber 10a, and a cooling water chamber 10c having an internal space C spaced from and surrounded by the thermal decomposition chamber 10a and closed.

At this time, a plurality of heating tube 14 passing through hollow inside of the thermal decomposition chamber 10a is provided thereon and further the flammable waste inputted into the internal space A is heated indirectly by high temperature heat through the heating tube 14 and carbonated in a state of the waste being shielded from air or gas, that is, there being no air to be burnt.

Meanwhile, the combustion chamber 10b is arranged on the lower part of the thermal decomposition chamber 10a and partitioned by a lower surface plate wherein high temperature air heated by the heating burner arranged on one side thereof is passed through the heating tube 14 to provide heat for decomposing thermally and carbonating the waste.

In addition, the cooling water chamber 10c is spaced from the thermal decomposition chamber 10a and surrounds and shields the thermal decomposition chamber wherein cooling water is inputted and circulated and further it is confirmed visually through the vacuum gage installed one side thereof whether the waste inside the thermal decomposition chamber 10a is shielded from air or gases, that is, there is no air to be burnt.

The configuration of the incineration furnace 10 mentioned above will be described in detail below.

Referring to FIG. 2, the water vapor generator 50 is communicated to the thermal decomposition chamber 10a of the trash burner through the water vapor supplying tube 51 wherein a self heating burner is provided on one side thereof and further water stored therein or water supplied through a water-supply pipe from an external water source is heated to generate over heated water vapor using fuel such as oil stored in a fuel tank 53 installed separately on an external place, and the over heated water vapor is forced to be injected into the internal space A of the thermal decomposition chamber 10a through the water vapor supplying tube 51.

Accordingly, the thermal decomposition chamber 10a is compressed to expand through a forced injection of the over heated water vapor and the waste becomes to be shield from air or gases. In other words, under the treatment of flammable waste according to the present invention, the enforced injected over heated water vapor is used in the water vapor generator 50 such that the waste is shielded from air in order for the waste to be thermal decomposed and carbonated without burning the waste.

In more detailed, the internal space A of the thermal decomposition chamber 10a is filled fully with the over heated water vapor so that expansion pressure is produced inside the thermal decomposition chamber by the over heated water vapor and further air or gases contained inside the waste is discharged outside by the expansion pressure.

At this time, since the inside of the thermal decomposition chamber is filled fully with the over heated water vapor, the discharged air or gases, and the air inside the thermal decomposition chamber are absorbed by the over heated water vapor and surrounded by water molecular particles. As a result, the flammable waste is shielded from the air to be burnt or gases by a water film of water vapor.

Since the flammable waste inside the thermal decomposition chamber 10a is shielded from air by the water film produced with the over heated water vapor, the flammable waste is not burnt by an external heat and decomposed thermally and carbonated.

This means that there is no air to be burnt inside the thermal decomposition chamber 10a, and further if some combustible air is existed inside the thermal decomposition chamber 10a, the flammable waste can be burnt to produce poisonous material such as dioxin.

Therefore, a confirmation of whether the flammable waste is shielded fully from air or gases inside the thermal decomposition chamber 10a is very important wherein it is determined using the pressure gauge PG and the vacuum gage VG installed on one side of the trash burner 10.

Meanwhile, the thermal decomposition chamber 10a of the trash burner filled with the over heated water vapor made through the water vapor generator 50 produces a expansion pressure and further it can be determined firstly whether the thermal decomposition chamber 10a is shielded from air or gases and thus there is no air to be burnt depending on previous calculation pressure value. This can be determined by reading pressure value on the pressure gauge PG.

However, it can not be judged precisely whether there is no air to be burnt only using the pressure value and thus other means using eyes is necessary. If the over heated water vapor is injected much more than prescribed amount, excessive expansion pressure may cause a safety accident.

In order to determine precisely visually that there is no air to be burnt inside the internal space A of the thermal decomposition chamber 10a which is pressure-expanded, the vacuum gage VG can be used. However, in a state of the inside of the thermal decomposition chamber being pressure-expanded, the vacuum gage VG is not operated and thus the expanded pressure is necessary to be lowered to operate easily the vacuum gage VG.

The lowering of the expanded pressure is made by a cooling water circulation of the cooling water chamber 10c in the trash burner 10 using a cooling unit 60. In addition, according to this procedure, the air or gases existing in the flammable waste is discharged firstly by an expanded pressure of the over heated water vapor and secondly the expanded pressure is decreased by the cooling water filled in the cooling water chamber 10c for the small amount of air or gases existing in the flammable waste to be discharged to make a space balance, thereby maximizing a thermal decomposition efficiency of the flammable waste.

At this time, the cooling unit 60 is communicated to the cooling water chamber 10c of the trash burner through a cooling water input tube 62 and a cooling water discharge tube 63 installed on side thereof, and through which the cooling water is provided and circulated.

More concretely, referring to FIG. 2, the cooling unit 60 includes the cooling water input tube 62 for supplying cooling water to the cooling water chamber 10c from an external water source through a valve, a cooling water discharge tube 63 for discharging outside the cooling water filled in the cooling water chamber 10c and used through a valve, and a cooling cooler 61 one side of which is connected to the one line of the cooling water input tube 62 and the other side of which is connected to one end of the cooling water discharging tube 63.

First, the cooling water input tube 62 supplies external cooling water supplied from a water supply pipe to the internal space C of the cooling water chamber 10c, and when the cooling water chamber is filled with the cooling water, the input of the cooling water from the external place is stopped. At this time, the cooler 61 receives the cooling water which is used in the cooling water chamber 10c through the cooling water discharge tube 63 and then re-cools it to re-input into the cooling water chamber through the side thereof connected to the cooling water input tube 62 line for its re-circulation.

Meanwhile, when it is confirmed that there is no air to be burnt in the thermal decomposition chamber 10a of the trash burner 10 through the vacuum gage VG, that is, the waste is shielded from air or gases, the cooling unit 60 discharges the cooling water inside the cooling water chamber 10c to make empty.

Subsequently, the purifier 20 is communicated to the thermal decomposition chamber 10a of the trash burner through a gas discharge tube 4 and the poisonous gas contained in rare gas and combustible gas is removed through this configuration. For this purpose, the purifier 20 includes a plurality of purification tanks 20a, 20b, 20c, a gas transfer tube 21 connecting them, and if necessary, a transfer pump.

In more detailed, referring to FIG. 2, the purifier 20 is connected to one end of the gas discharge tube 4 such that the rare gases and the combustible gases containing the poisonous material are inputted therein. After that, the poisonous material and smell are removed using neutralization water, absorption coal or purification filter. Here, the purifier 20 includes at least one more of storage tanks 20a, 20b, 20c communicated each other by the transfer tube 21.

Preferably, the last storage tank 20c is configured using filters, and is connected to a combustible gas storage reservoir 30 by the gas transfer tube 21 so that the combustible gas passing through the purifier 20 is stored in the combustible gas storage reservoir 30.

In other words, the combustible gas storage reservoir 30 is communicated to the purifier 20 through the gas transfer tube 21 to store the purified combustible gas therein and some of it is circulated to the combustion chamber 10b of the trash burner 10 through a gas circulation tube 31 to re-inputted.

The combustible gas re-inputted into the combustion chamber 10b is burnt to a flame of the heating burner 70 to use as a fuel of the heating burner 70 to maximize a thermal efficiency.

Namely, as aforementioned, some of the combustible gas circulated through the gas circulation tube 31 connecting from the combustible gas storage reservoir 30 to the internal space B of the combustion chamber 10b of the trash burner is burnt inside the combustion chamber 10b by the flame of the heating burner 70 to produce heat and thus higher temperature air is transferred to the thermal decomposition chamber 10a to maximize a thermal efficiency and avoid poisonous material being discharged to atmosphere or unauthorized wasting.

At this time, a temperature of the thermal decomposition chamber 10a in which the flammable waste is decomposed thermally and carbonated is kept not more than 700° C. As a result of the thermal decomposition at low temperature, a saving energy effect according to the treatment method of flammable waste can be maximized.

Meanwhile, high temperature air produced in the combustion chamber 10b, that is, waste heat is recovered and cooled to be discharged to external atmosphere, and for this purpose the thermal decomposing system 1 of the flammable waste according to the present invention includes the cooling tower 40 which is communicated to a waste heat recovery tube 3 connected to the heating tube 14 of the trash burner 10 and collecting the high temperature air passing therethrough and cools the high temperature air to be discharge to atmosphere.

Here, when the high temperature air is discharged directly to atmosphere, it causes to increase an atmospheric temperature and deteriorate environment. Accordingly, in order to avoid this disadvantageous effect the cooling tower 40 is installed to be communicated to an end of the waste heat recovery tube 3.

Referring to FIG. 2, the cooling tower 40 includes a long case 41 wherein a cooling water tube 42 is installed inside the case 41 and a cooling water tank 46 communicating to the case 41 is installed on the lower side thereof.

The cooling water tube 42 is connected to the cooling water tank 46 through the cooling water transfer tube 45 wherein a plurality of injection nozzles 43 is installed in the cooling water tube 42 and a pump is provided between the cooling water transfer tube 45 and the cooling water tank 46 to transfer the cooling water stored in the cooling water tank 46 to the cooling water tube 42 at a proper pressure.

As a result, when the waste heat (high temperature air) is inputted into the cooling tower 40 through the waste heat recovery tube 3, the cooling water in the cooling water tank 46 is moved into the case 41 at a proper pressure through the cooling water transfer tube 45 and the cooling water tube 42 and then the moved cooling water is injected therein through the injection nozzle 43. After that, the high temperature air is cooled fully by the injected cooling water and discharged to atmosphere through a discharge tube 44. In addition, water injected through the injection nozzle 43 is re-inputted the cooling water tank 46 through a communication tube 47 extending downward, and reused.

In other words, the waste heat recovery tube 3 is communicated to one side of the cooling tower 40 and the discharge tube 44 is connected to the upper part of the cooling tower 40. Here, the cooling tower 40 includes the case 41 provided vertically with the cooling water tube 42 in which a plurality of nozzles 43 is formed, the cooling water transfer tube 45 which is connected to the cooling water tube 42 and a pump and transfers the cooling water, the communication tube 47 extending down the case 41, and the cooling water tank 46 the upper part of which is communicated to and one side of which is connected to the cooling water transfer tube 45. As a result, the high temperature air which is transferred by the waste heat recovery tube 3 is cooled by a water injection a through the injection nozzle 43 to be discharged to atmosphere.

Again, referring to FIGS. 2 to 7, the trash burner 10 applicable to the thermal decomposition system 1 of the flammable waste of the present invention will be described in detail as follows.

First, the trash burner 10, as aforementioned, includes the thermal decomposition chamber 10a, the combustion chamber 10b and the cooling water chamber 10c. Preferably, the thermal decomposition chamber 10a and the cooling water chamber 10c have closed internal space A, C and a temperature sensor TS, a pressure gauge PG, a safety valve SV, and a vacuum gauge VG on an external part thereof, and plural tubes are connected to them such that internal temperature, pressure, etc., are measured to meet proper process condition and risks are avoided.

In more details, referring to FIGS. 3 and 4, the thermal decomposition chamber 10a of the trash burner 10 is the internal space A in which the flammable waste is inputted therein and heated and dried, and decomposed thermally and carbonated wherein a waste input port 15 provided with an open and closable cover 15a through which the flammable waste is inputted is formed on upper side of the thermal decomposition chamber 10a, an ash collecting hole 16 provided with an open and closable cover 16a through which thermally decomposed and carbonated flammable waste is collected is formed on one lower side of the thermal decomposition chamber 10a. Additionally, the thermal decomposition chamber has a closed internal space and an internal drum body 12 in which a plural heating tubes 14 passes through a bottom plate 12-1 and an upper plate 18.

At this time, a gas discharge port 17 connected to the gas discharge tube 4 and a vapor supply port 10c-3 connected to the vapor supply tube 51 are formed on one side of the internal drum body 12, and further the safety valve SV, the temperature sensor TS, the pressure gauge PG and the vacuum gauge VG are formed on one side of the internal drum body 12. Preferably, the gas discharge port 17 is formed on one side of the upper plate 18 and the vapor supply port 17 is formed on the lower part of the internal drum body 12.

Meanwhile, the pressure gauge PG and the vacuum gauge VG are installed by the pressure/vacuum gauge connection unit 19 formed on one side of the internal drum body 12.

More concretely, referring to FIG. 6, the pressure gauge PG and the vacuum gauge VG are connected to the pressure/vacuum gauge connection unit 19 formed on the upper plate 18 of the internal drum body 12 and further the respective gauges are formed on two branching tubes 5a of a gauge connection tube 5 extending outside, respectively, together with the control valve V to determine a state of the thermal decomposition chamber 10a by an adjustment of the control valve V.

This configuration is aimed for a user to confirm visually a state of there being no air to be burnt in the combustion chamber, and if necessary, the pressure gauge PG and the vacuum gauge VG may be installed on one side of the internal drum body 12 since they can be confirmed and determined by an automatic device.

In subsequent, referring to FIGS. 3 and 4 again, the combustion chamber 10b of the trash burner 10 is a place to provide heat for decomposing thermally the waste to the thermal decomposition chamber 10a of the trash burner and further the heating burner 70 forming a high temperature flame by a fuel such as oil provided in a separate fuel tank 71 is formed on one side of the combustion chamber 10b. Additionally, the combustion chamber 10b includes a main body 13 inner peripheral surface of which is surrounded by fire material and which has the internal space B and is communicated to the heating tube 14. At this time, the fire material may be a fire brick depending on durability and efficiency thereof.

Furthermore, a gas circulation port 13-3 connected to the gas circulation tube 31 of the combustible gas storage reservoir 30 described above is formed on one side of the main body 13 of the combustion chamber 10b and a burner placement hole 13-1 in which the heating burner 70 for heating air with flame made by ignition of fuel is placed, is formed. Preferably, two heating burners 70 are provided and the heating burners 70 are provided depending on them.

The aforementioned combustion chamber 10b is configured such that it is not shielded for the air necessary for an ignition to be ventilated therethrough and further external air may be continuously inputted for an efficient ignition.

For this purpose, the main body 13 of the combustion chamber 10b further includes a plurality of air input ports 13-2 communicating to external air and further the air input ports 13-2 are connected to air input units (not shown) for external air to be inputted continuously.

Since high temperature flame is produced in the combustion chamber 10b of the trash burner by the heating burner 70, the heating tube 14 fitted in a through hole 12-2 formed on the bottom plate 12-1 of the thermal decomposition chamber 10a is heated through a heat conduction and at this time the high temperature air heated by the heating burner 70 passes through inside the heating tube 14 and is heated further, and produced heat dries the flammable waste in the thermal decomposition chamber 10a.

Meanwhile, referring to FIG. 5, the heating tube 14 which is communicated to the combustion chamber 10b and passes through from the top to the bottom of the thermal decomposition chamber 10a will be described below.

As shown in FIG. 5, preferably the heating tube 14 is configured as a repeatedly curved tube shape and includes a lower tube 14a fitted into the bottom plate 12-1 of the thermal decomposition chamber 10a and communicated to the combustion chamber 10b, a plurality of connection tube 14b connected to the upper part of the lower tube 14a and shaped as repeated 'S' character, and an upper tube 14c one end of which is connected to the upper part of the connection tube 14b and the other end of which is connected to the waste heat recovery tube 3 and which passes through the upper plate 18 and on upper end of which a damper 14c-1 is formed.

The heating tube 14 configured as aforementioned may be installed as a plurality and preferably 4 heating tubes may be installed, as shown in FIG. 4.

Meanwhile, referring to FIGS. 3 and 4 again, the cooling water chamber 10c of the trash burner 10 includes an external drum body 11 which is spaced from an outer side surface of the internal drum body 12 consisting of the thermal decomposition chamber 10a and surrounded thereby and has an internal space therebetween.

At this time, a cooling water input port 10c-1 connected to a cooling water input tube 62 of a cooling unit 60 and a cooling water discharge port 10c-2 connected to the cooling discharge tube 63 are formed on one side of the external drum body 11. Here, the cooling water input port 10c-1 may be formed on the upper part of the external drum body 11.

Meanwhile, the trash burner 10 is placed to be spaced from an earth ground by a support frame 10d supporting the trash burner 10 so that its installment and repair and maintenance is easily performed. Furthermore, the main body 13 of the combustion chamber 10b provided on the lowest part of the trash burner 10 is fixed to the upper part of the support frame 10d.

Additionally, a ladder 2 is provided on one external side of the trash burner 10 such that a worker can ride on to input easily the flammable waste through the waste input port 15 and repairs and maintenances the trash burner 10. At this time, the ladder 2 has a longer length than a whole length of the trash burner 10 and further includes a safety net 2a for ensuring a safety.

Referring to the thermal decomposition system 1 of the flammable waste according to the present invention, in the inside of the trash burner 10 containing the flammable waste, the waste is shielded from air or gases by an expansion pressure using over heated water vapor produced in the water vapor generator 50 to make no air to be burnt therein and then the expansion pressure is lowered using cooling water of the cooling unit 60 and the state is confirmed by the vacuum gauge. After that, the waste is heated and dried by an indirect heating using heat produced by the burner 70 to be decomposed and carbonated, and poisonous gases contained rare gases and combustible gases produced at this time is removed using the purifier 20 and the combustible gas is stored in the combustible gas storage reservoir 30 to be reused or stored therein.

In the meantime, the high temperature air used in a procedure of thermal decomposition and carbonation of the flammable waste in the burner 10 is collected through the waste heat recovery tube 3 and is cooled through the cooling tower 40 in a cooling tower injection way to discharge to atmosphere.

In addition, ash of the flammable waste remaining after a thermal decomposition and carbonation of the flammable waste in the trash burner 10 is collected and then retreated.

FIG. 5 is a flowchart showing a waste treatment method using a thermal decomposition treatment system of flammable waste according to the present invention. The waste treatment method of the using a flammable waste thermal decomposition treatment system of flammable waste configured as aforementioned will be described in detail as follows.

As shown in FIG. 7, the flammable waste treatment method 1 using a thermal decomposition treatment system of flammable waste according to the present invention comprises mainly steps of inputting the waste S1, shielding ignition S2, confirming the shielding S3, heating and drying S4, thermal decomposing and carbonating S5, discharging gases S6, circulating and storing gases S8, and further recovering waste heat and cooling S7.

First, a step of inputting the waste S1 refers to a procedure of inputting the flammable waste into the thermal decomposition chamber 10a of the trash burner 10 configured as aforementioned wherein the upper cover 15a of the thermal decomposition chamber 10a is opened and the waste input port 15 is opened and then the flammable waste is inputted therein. At this time, preferably, it is important that the thermal decomposition chamber 10a is shielded for further external air not to be inputted therein so that in a subsequent ignition shielding step a contact of the waste and air is cut off more easily to save energy and improve a thermal decomposition efficiency.

In subsequent, in the following ignition shielding step S2 over heated water vapor is forced to be inputted into the thermal decomposition chamber 10a and thus there is no air to be burnt in the thermal decomposition chamber by an expansion pressure resulted from the over heated water vapor, that is, the waste is shielded from air or gases.

At this time, a temperature of the over heated water vapor is preferably about 100 to 300° C., and the over heated water vapor is produced through the water vapor generator 50 and is forced to inputted into the thermal decomposition chamber 10a through the water vapor supply tube 51. Here, the inputted over heated water vapor forces air or gases contained in the flammable waste inside the thermal decomposition chamber to be discharged outside and further the flammable waste is shielded from air or gases using a water film to make no air to be burnt by heat.

Additionally, the over heated water vapor is inputted to an extend that the inside of the thermal decomposition chamber 10a is expanded to a proper pressure and it is confirmed using the pressure gauge, and if it reaches to the proper pressure, inputting of the over heated water vapor is stopped and further it is determined whether the waste in the thermal decomposition chamber is shielded from air or gases.

As a result, since there is no air to be brunt inside the flammable waste, it is thermally decomposed and carbonated without being burnt even in a condition of high temperature heat.

Meanwhile, the vacuum gauge VG is used to confirm a state of the thermal decomposition chamber 10a; however, in a state of expanded pressure it is not easy to confirm so that the expanded pressure is lowered by circulating the cooling water into the inside of the internal space C of the cooling water chamber 10c surrounding the thermal decomposition chamber 10a by using the cooling unit 60.

This refers to the shielding confirmation step S3 wherein the cooling water is inputted into the internal space C of the cooling water chamber 10c to lower a surface temperature of the thermal decomposition chamber 10a and the expanded pressure caused from the over heated water vapor so that it is confirmed through the vacuum gauge VG provided on one side of the thermal decomposition chamber 10a that there is no air in the thermal decomposition chamber.

In other words, cooling water is inputted into the internal space C of the cooling water chamber 10c through the cooling water input tube 62 using an external water supply pipe to lower the temperature in the thermal decomposition chamber 10a and control the expanded pressure. In the meantime, when the cooling water chamber 10c is filled with cooling water, a control valve is closed and the used cooling water is discharged through the cooling water discharge tube 63. At this time, the cooling water is inputted into a cooling cooler 61.

Furthermore, the cooling water is cooled again by the cooling cooler 61 and the cooling water is inputted and circulated into the cooling water chamber 10c using one side of the cooling water input tube 62 line communicated to the cooling cooler 61.

Meanwhile, when a state of the thermal decomposition chamber 10a is confirmed visually through the vacuum gauge VG, the cooling water in the cooling water chamber 10c is discharged totally and then the combustion chamber 10a is heated using the heating burner 70 and further high temperature air produced from the heat heats indirectly the combustion chamber 10a to heat and dry the flammable waste wherein it refers to heating and drying step S4.

The heating burner 70 forms high temperature flame by firing fuel such as oil provided on the separate fuel tank 71 and further the combustible gas supplied from the combustible gas storage reservoir 30 to the combustion chamber 10b through the gas circulation tube 31 is fired by the flame of the burner 70 to produce heat causing higher temperature heat.

In addition, the higher temperature heat passes inside the plurality heating tubes 14 installed through the thermal decomposition chamber 10a and heats the thermal decomposition chamber through heat conduction and as a result the flammable waste is dried. At this time, the over heated water vapor in the thermal decomposition chamber 10a is re-expanded by the above heating.

Subsequently, the thermal decomposition chamber 10a is subject to the thermal decomposing and carbonating step of the flammable waste S5.

In the thermal decomposition and carbonating step S5, the flammable waste is decomposed thermally and carbonated by the temperature in the thermal decomposition chamber raised by the heat conduction of the heating tube 14 and further since air or gases existing inside the flammable waste is absorbed by water vapor in the thermal decomposition chamber 10a and there is no air to be burnt, the flammable waste is decomposed and carbonated without being burnt.

At this time, the temperature of the thermal decomposition chamber 10a where the decomposition and carbonation of the flammable waste occur does not exceed 700° C. Accordingly, energy saving effect of the flammable waste treatment method according to the present invention performed on the lower thermal decomposition temperature can be maximized.

Meanwhile, when the over heated water vapor is re-expanded to produce a pressure and the pressure is sensed to be equal to or more than a predetermined pressure, a valve is automatically opened by an automatic safety valve and thus the over heated water vapor is discharged, and this refers to the gas discharging step S6.

Again mentioned, in the gas discharging step S6, the over heated water vapor re-expanded through the heating and drying step S4 and the decomposition and carbonation step S5, and rare gas and combustible gas containing poisonous gas produced at this time are discharged automatically outside through an operation of a valve.

In subsequent, the gas circulation and storage step S8 is performed wherein the rare gas and combustible gas containing poisonous material discharged in the gas discharging step S6 are purified through the purifier 20 and the combustible gas is stored in the combustible gas storage 30. At this time, some of the combustible gas is inputted into the internal space B of the combustion chamber 10b through the gas circulation tube 31 and is burnt by the flame of the heating burner to produce higher temperature heat.

Meanwhile, the high temperature air heating indirectly the thermal decomposition chamber through the thermal decomposition and carbonation step S5 is collected and is cooled by the cooling tower in a water injection way and discharged, this is referred to the waste heat recovery and cooling step S7.

In other words, the hot high temperature air passing through the heating tube 14 of the trash burner 10 is collected through the waste heat recovery tube 3 and is transferred to the cooling tower 40.

Furthermore, inside the case 41 of the cooling tower 40 the high temperature air is cooled by the cooling water injected through the injection nozzle 43 connected to the cooling water tube 42 and is discharged outside through the discharging tube 44.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A thermal decomposition treatment system of flammable waste, comprising:
    a trash burner including a thermal decomposition chamber having a pressure gauge and a vacuum gage in which a plurality of heating tubes passing through a hollow inside thereof is provided and the flammable waste inputted therein is heated indirectly by the heat emitted from the heating tubes and decomposed thermally and carbonized, a combustion chamber which is placed separately by a partition on the lower part of the thermal decomposition chamber and provides heat for decomposing the waste by allowing the heated high temperature air to be passed through the heating tubes, and a cooling water chamber which is spaced from and surrounding the thermal decomposition chamber and into which the cooling water is inputted and circulated;
    a water vapor generator which is communicated to the thermal decomposition chamber through the water vapor supply tube, and which allows over heated water vapor to be inputted to the thermal decomposition chamber;
    a cooling unit which is communicated to the cooling water chamber through a cooling water input tube and a cooling water discharging tube, and which allows the cooling water to be supplied provided to and circulated through the cooling water chamber;
    a purifier which is communicated to the thermal decomposition chamber through the gas discharging tube, and which allows poisonous gases to be removed from the thermal decomposition chamber;
    a combustible gas storage reservoir which is communicated to the purifier through a gas transfer tube and stores the purified combustible gas, and allows some of the purified combustible gas to be inputted into the combustion chamber through a gas circulation tube; and
    a cooling tower which is communicated to a waste heat recovery tube connected to the heating tube and which collects high temperature air passed therethrough, and allows the high temperature air to be cooled and discharged to atmosphere.

2. A thermal decomposition treatment system of flammable waste as claimed in claim 1, wherein the thermal decomposition chamber of the trash burner further includes a waste input port provided with a openable cover for inputting the waste on one upper side thereof, an ash collection port provided with an openable cover for collecting the decomposed thermally and carbonized waste on one lower side thereof, and an internal drum body having a closed internal space where a plurality of heating tubes passes through an upper place and a bottom place, and wherein a gas discharging port connected to the gas discharging tube and a water vapor supply port connected to the water vapor supply tube, a safety valve, and a temperature sensor are formed on one side of the internal drum body.

3. A thermal decomposition treatment system of flammable waste as claimed in claim 1, wherein the pressure gauge and the vacuum gauge are connected to pressure/vacuum gauge connection ports formed on the upper plate of the internal drum body and are formed, respectively, on two branch pipes of a gauge connection tube extending externally.

4. A thermal decomposition treatment system of flammable waste as claimed in claim 2, wherein the heating tube is configured as a repeated curved tube shape, and includes a lower tube fitted into a lower surface plate of the thermal decomposition chamber and communicated to the combustion chamber, a plurality of connection tubes connected to the upper part of the lower tube and forming a repeated curved shape, and an upper tube one end of which is connected to the upper part of the connection tube and the other end of which is connected to the waste heat recovery tube and which passes through the upper plate of the thermal decomposition chamber and on upper end of which a damper is formed.

5. A thermal decomposition treatment system of flammable waste as claimed in claim 1, wherein the combustion chamber of the trash burner includes a main body inner peripheral surface which is surrounded by fire-proof material and which has an internal space communicated to the heating tube, a gas circulation port connected to the gas circulation tube on one side of the main body, and a burner placement hole into which a burner for heating is placed.

6. A thermal decomposition treatment system of flammable waste as claimed in claim 5, wherein the main body of the combustion chamber further includes an air input port and wherein the air input port is connected to an air input unit inputting continuously external air.

7. A thermal decomposition treatment system of flammable waste as claimed in claim 1, wherein the cooling water chamber of the trash burner includes an external drum body spaced from a predetermined distance from an external surface of the thermal decomposition chamber and having a closed internal space therebetween wherein a cooling water input port connected to a cooling water input tube is formed on one side of the external drum body and a cooling water discharging port connected to a cooling water discharging tube is formed on one side of the external drum body.

8. A thermal decomposition treatment system of flammable waste as claimed in claim 1, wherein the trash burner further includes a support frame which is placed on the lower part of the combustion chamber and spaced a predetermined distance from an earth ground, and a ladder on an external side thereof which has a longer length than a whole length of the trash burner and on upper part of which a safety net is provided.

9. A thermal decomposition treatment system of flammable waste as claimed in claim 1, wherein the cooling unit includes a cooling water input tube supplying external cooling water to the cooling water chamber through a valve adjustment, a cooling water discharge tube for discharging outside the cooling water contained in the cooling water chamber through a valve adjustment and a cooling cooler on one side of which is connected one side among the cooling water tube lines and the other side of which is connected to an end of the cooling water discharge tube wherein when the cooling water chamber is filled with the cooling water, the external cooling water inputting through the cooling water input tube is stopped and the cooling cooler re-cools the cooling water used in the cooling water and allows the re-cooled cooling water to be inputted into the cooling water chamber to be circulated.

10. A thermal decomposition treatment system of flammable waste as claimed in claim 1, wherein the purifier includes purification tanks communicated to each other through the gas transfer tube in which rare gases and combustible gas are inputted therein through a connection to an end of the gas discharge tube and poisonous material and smell are removed using neutralizing water, absorption coal or a filter.

11. A thermal decomposition treatment system of flammable waste as claimed in claim 1, wherein the cooling tower includes a case to one side of which the waste heat recovery tube is communicated and upper part of which is connected to the discharge tube and on inner part of which a plurality of cooling tubes with injection nozzles is provided vertically, a cooling water transfer tube connected to the cooling water tube through a pump and transferring the cooling water, and a cooling water tank the upper part of which is connected to a communication tube extending down the case and one side of which is connected to the cooling water transfer tube wherein the high temperature air transferred through the waste heat recovery tube by a cooling water injection through the injection nozzle is cooled and discharged.

12. A waste treatment method using a thermal decomposition treatment system of a flammable waste, which comprises a trash burner including a thermal decomposition chamber, a combustion chamber placed on the lower part of the thermal decomposition chamber and a cooling water chamber surrounding spacedly the thermal decomposition chamber, comprising:

inputting the waste into the thermal decomposition chamber and closing it;

shielding an ignition by injecting over heated water vapor into the thermal decomposition chamber and shielding the waste from air or gases by an expanded pressure of the over heated water vapor;

confirming the ignition shielding by inputting the cooling water into the cooling water chamber and lowering the expanded pressure caused from the over heated water vapor in the thermal decomposition chamber and an operation of a vacuum gauge provided on one side of the thermal decomposition chamber and no air to be burnt in the thermal decomposition chamber;

heating and drying the waste by heating the combustion chamber through a burner and heating indirectly the thermal decomposition chamber through high temperature air made by the heating;

decomposing thermally and carbonizing the flammable waste with high temperature in the thermal decomposition chamber;

gas discharging the re-expanded over heated water vapor through the heating and drying step and the thermal decomposition carbonizing step and the produced rare gases and combustible gas through an operation of a valve; and a gas circulating or storing including purifying contaminated gas discharged in the gas discharging step through a purifier and storing the combustible gas to a combustible gas storage reservoir or circulating the combustible gas to the combustion chamber.

13. A waste treatment method using a thermal decomposition treatment system of flammable waste as claimed in claim 12, further comprising collecting the high temperature air which heats indirectly the thermal decomposition chamber in the thermal decomposition and carbonizing step, and cooling it using a cooling tower in a cooling water injection way and discharging it.

14. A waste treatment method using a thermal decomposition treatment system of a flammable waste as claimed in claim 12 or 13, wherein a trash burner includes a thermal decomposition chamber in which a plurality of heating tubes passing through a hollow inside thereof is provided and the flammable waste inputted therein is heated indirectly by the heat emitted from the heating tubes and is decomposed thermally and carbonized, a combustion chamber which is placed separately by a partition on the lower part of the thermal decomposition chamber and provides heat for decomposing the waste by allowing the heated high temperature air to be passed through the heating tubes, and a cooling water chamber which is spaced from and surrounding the thermal decomposition chamber and into which the cooling water is inputted and circulated wherein a safety valve, a temperature sensor, a pressure gauge and a vacuum gauge are formed on one side of the thermal decomposition chamber.

* * * * *